July 5, 1938.  F. L. PRESCOTT  2,122,437
RECORD SHEET HOLDER
Original Filed Sept. 5, 1931   2 Sheets-Sheet 1
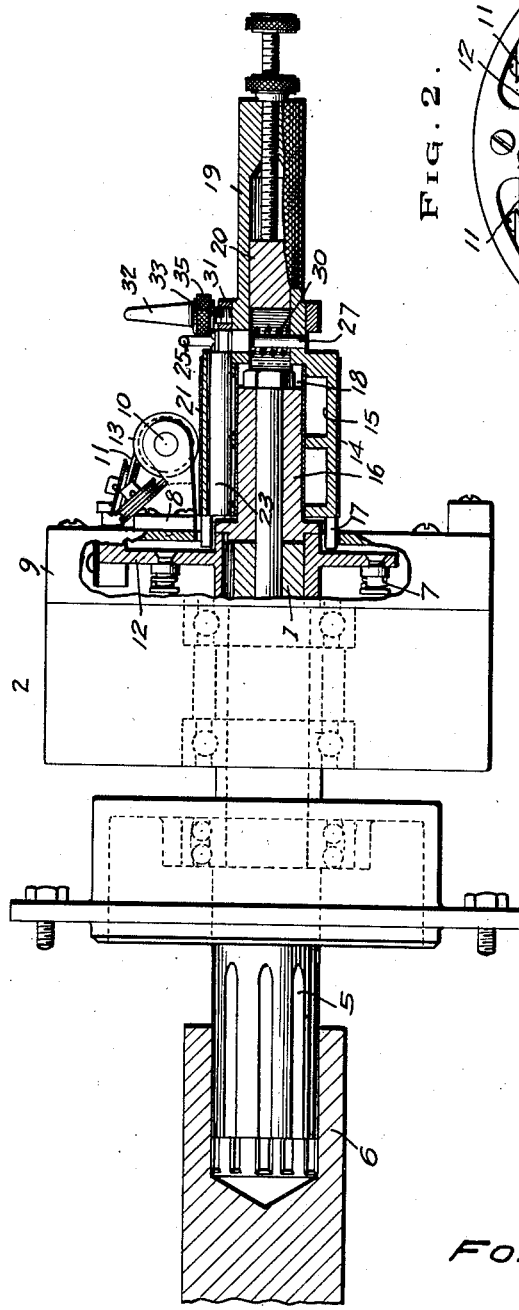
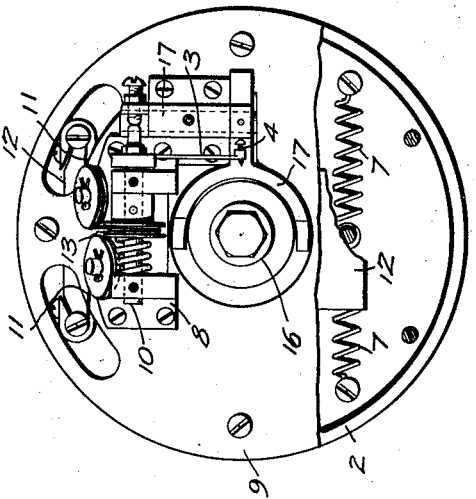
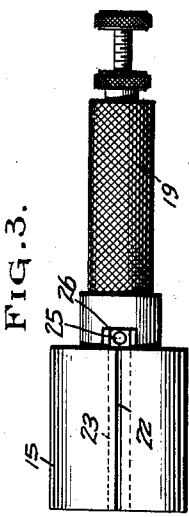
INVENTOR
FORD L. PRESCOTT
BY Robert V. Laughlin
and Charles Koontz
ATTORNEYS July 5, 1938.　　　　F. L. PRESCOTT　　　　2,122,437
RECORD SHEET HOLDER
Original Filed Sept. 5, 1931　　2 Sheets-Sheet 2
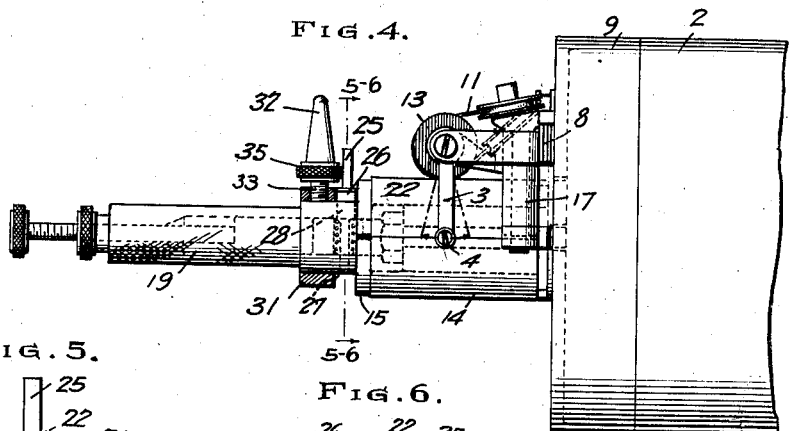
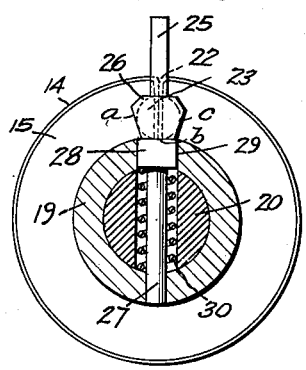
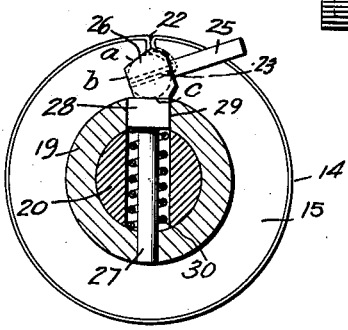
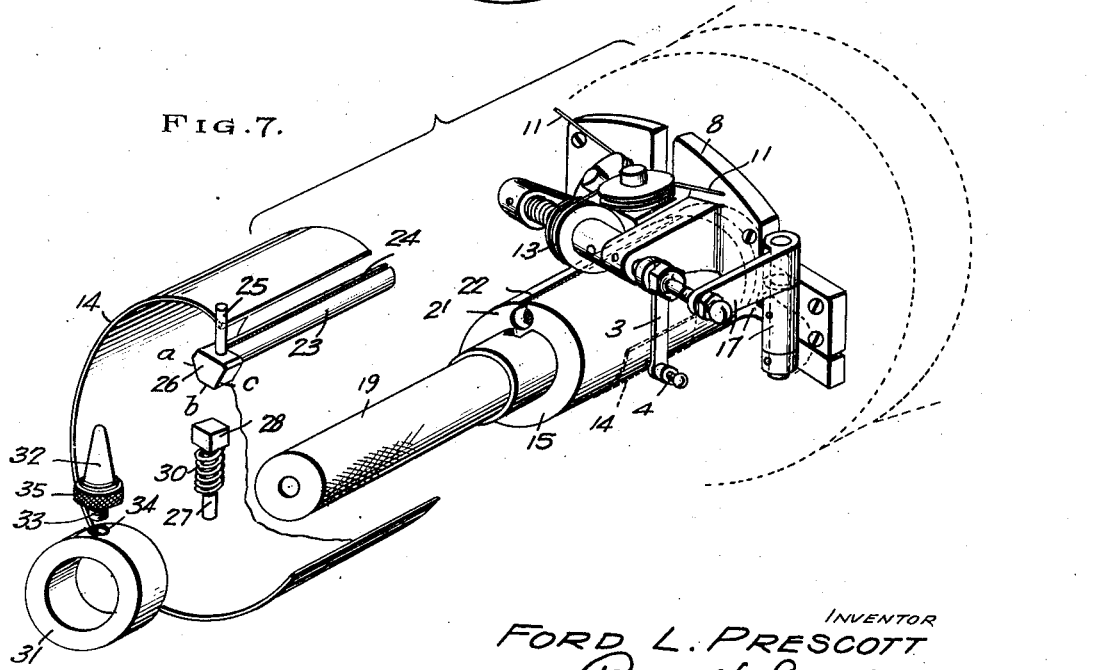
INVENTOR
FORD L. PRESCOTT
BY
ATTORNEYS Patented July 5, 1938

2,122,437

UNITED STATES PATENT OFFICE 2,122,437

RECORD SHEET HOLDER

Ford L. Prescott, Dayton, Ohio

Original application September 5, 1931, Serial No. 561,488. Divided and this application October 15, 1936, Serial No. 105,777

5 Claims. (Cl. 234—70)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to subject matter which has been divided out of my co-pending application, Serial No. 561,488, filed September 5, 1931, for a Torsional vibration recording instrument, which matured into Patent No. 2,069,271, dated February 2, 1937.

The prior filed application discloses a torsiometer designed for the study and the recordation of the vibration characteristics of engine crank shafts, particularly aircraft engine crank shafts, and is directed more or less to the vibration exhibiting mechanism of the instrument whereas the instant case is directed to novel recording features comprising chart and drum handling shown and described but not claimed in the parent application above identified.

In the accompanying drawings illustrating the invention:—

Figure 1 is a side view, partly in elevation and partly in section of the torsiometer instrument and record-receiving member in assembled relation;

Figure 2 is an end view of the torsiometer with the record receiving member omitted and with fragments broken away to expose the elastic drive;

Figure 3 is a top view of the record-holder or drum with the record-receiving card omitted;

Figure 4 is a side view of the assembled torsiometer and record-receiving member, the reverse of that shown in Figure 1 and with the parts in elevation;

Figure 5 is a cross sectional view on an enlarged scale of the record sheet holder or drum taken on line 5—5 of Figure 4 and showing the record sheet clamping mechanism in released position;

Figure 6 is a view similar to Figure 5 but showing the record sheet clamping mechanism in sheet-clamping position, and Figure 7 is a view in perspective of a portion of the torsiometer and recording mechanism with the record sheet and sheet-clamping mechanism and the index in a disassembled state.

The vibration exhibiting mechanism for which the herein described record sheet holder is especially adapted and to which the claims of the prior filed parent application are directed is shown generally in Figures 1, 2 and 3 and, briefly described, comprises a non-uniformly rotatable member 1 and a uniformly rotatable member 2 with mechanism for imparting vibratory motion to an indicating hand 3 carrying a stylus or pencil 4. The member 1 comprises a short shaft or arbor having an expanding spline 5 at one end for attachment to a starter claw 6 of an engine crank shaft whereby the arbor will be rotated at the same non-uniform angular velocity as and with the same torsional vibration characteristics of the crank shaft. The member 2 is an inertia flywheel supported on the arbor and having an elastic or spring drive connection 7 therewith whereby it is caused to rotate with the crank shaft and arbor but at a substantially uniform or constant angular velocity equal to the average angular velocity of the crank shaft; any torsional vibrations in the arbor resulting from the non-uniform angular velocity of the crank shaft being substantially absorbed by the elastic drive connection and, hence, not appreciably affecting or disturbing the uniform rotation of the flywheel. Mounted in a bearing bracket 8 fixed to the fly wheel cover 9 so as to turn therewith is a rotatable and axially slidable shaft 10 carrying the indicating hand 3. Shaft 10 and indicating hand 3 are operatively connected to the arbor, to have an oscillatory or vibrational movement imparted thereto in response to variations in the angular velocity of the crank shaft, by a flexible cable 11 connected at its ends to a driving member 12 fixed on the arbor 1 and winding around a cable drum 13 fixed on the indicator shaft 10. The resultant displacement of the pencil-bearing end of the indicating hand gives an amplified indication of the torsional deflection or vibration of the crank shaft and a record of the displacement is made on an ordinary indicator paper or card 14 mounted on a support or holder 15. Since the pencil revolves with the instrument, the holder with record paper in place thereon is held in the hand, placed over a rotating pilot or centering guide 16 at the end of the arbor, and then quickly pushed in and withdrawn. During the last one thirty-second inch of motion inwardly upon the guide, the holder 15 operates a bell-crank system 17 which presses the pencil against the paper. The pencil in its travel around the record-sheet holder will trace on the record-receiving sheet or cord a wavy line or curve, the undulations of which constitute a record or chart of the torsional vibrations of the engine crank shaft. The record of one engine cycle, or two revolutions of the crank shaft, comprises two curves superposed.

The instant invention differs from conventional and prior torsiometers in that records produced by the former are made on paper rolls or cylindrical strip which are subsequently unrolled and flattened out with the straightened record strips arranged in relatively overlapping relation for better comparison of the different records whereas the records produced by the latter are generally in the form of polar diagrams on the faces of flat circular cards or disks. Hence, for the purposes of the present invention, the record sheet holder 15 is made in the form of a cylinder or drum having a pilot-receiving axial bore 18 opening inwardly of one end and a hollow handle 19 extending axially from its opposite end. The drum 15, with the record-receiving strip 14 clamped thereon as hereinafter explained, is adapted to be placed endwise upon the pilot bearing 16 of the torsiometer and slid inwardly thereon by means of its handle 19 to a position predetermined by the setting of an adjustable stop block 20; the drum being held manually against rotation with the pilot bearing turning within the bore 18. The pilot bearing thus serves as a guide for centering the drum properly with respect to the axis of rotation of the revolving hand and pencil.

For the purpose of clamping the record-receiving strip to the drum so that there will be no slack, a sheet clamping mechanism is provided on the record sheet holder in the following manner. The drum 15 is provided with a longitudinally extending cylindrical bore 21 of substantially small diameter adjacent to but below the outer surface of the drum and opening outwardly of the opposite ends of the latter. The portion of the drum intermediate the bore 21 and the diametrically adjacent surface is cut away to provide an open narrow slot 22 coextensive with the bore 21. A cylindrical rod 23 having a paper-receiving slot 24 is journaled in said bore 21 to be turned about an axis in either direction for moving the paper-receiving slot to and from a position in which it is aligned with the drum slot 20; the rod being manually turned by means of a handle 25 carried by a head 26 on the outer end of the rod. Head 26 is formed as a prismoidal body having angularly disposed flat lateral faces a—b—c and the drum handle 19 has a plunger 27 mounted therein with a square head 28 operating through a square opening 29 in the handle to engage each of the said flat faces for the full width of the latter as they are brought into alignment with the plunger head 28 by the turning of the rod 23; the head 28 of the plunger being pressed against the side of the body 26 by the thrust of a plunger-encircling spring 30. As will be obvious from the construction illustrated in Figures 5 and 6, the engagement of the plunger with the body 26 does not restrict the turning of the rod 23 manually to one direction and whether the rod be turned manually about its axis in a clockwise or counterclockwise direction, the top flat face of the plunger head is adapted to contact the lateral faces of the body 26 successively and in a plane normal to a line perpendicular to the axis of the body and passing centrally through the contacting faces. When the flat face a of the rod is in abutment with the head of the plunger, as illustrated in Figure 5, the handle 26 is upright and the slot 24 of the rod is in alignment with the slot 22 of the drum. In this position of the parts, the holder is in condition either to have a record-receiving sheet attached thereto or to release a previously placed record-receiving sheet. In attaching the sheet, the latter is placed around the outside of the drum with its free ends disposed inwardly through the drum slot 22 and secured in the slot 24 of the rotatable rod 23. The handle 25 is then moved from the upright position shown in Figure 5 to the inclined position shown in Figure 6, imparting to the rod a turning movement that shifts the slot 24 in a direction clockwise of the slot 22 and thereby drawing the ends of the sheet or strip into the drum and tightening the sheet about the supporting surface of the drum. In this position of the rod, the side face c is in contact with the head of the plunger 27, the pressure of which holds the rods in sheet-tightening position. The handle 25 may, if desired, be swung to the left in Figure 5 rather than to the right, in which case the turning movement of the rod is arrested when the flat face a is in abutment with the plunger 27.

The record sheet holder always occupies the same angular position on the pilot bearing when making a number of records with a particular setting of the engine and for identifying this position a manually settable index is provided. This index consists of a rotatable ring 31 encircling the drum handle 19 and a pointer 32 having a screw-threaded stud or shank 33 engaged in a screw threaded opening 34 in the ring and of a length to bear against the drum handle; the pointer having a knurled head or thumb-piece 35 whereby it may be turned either to screw the stud tight against the drum handle for locking the ring against rotation or to unscrew the stud to permit relative rotation of the ring and drum. In setting the index, the drum with record receiving sheet in place thereon is slid over the pilot bearing and, with the engine set on top center of one cylinder, the beginning of the card is lined up with the pencil by turning the drum relatively to the ring until the slot 22 is opposite the pencil, the pointer being meanwhile held in some selected reference position, such as the vertical, which it is intended to occupy whenever the drum is placed on the pilot bearing. The pointer is then screwed down tight so that its angular distance from the beginning of the card is fixed. This serves to locate the crank positions on the record and it will be obvious that if the drum, subsequent to its withdrawal from the pilot bearing at any stage in the operation of the engine, be replaced upon the pilot bearing with the pointer in vertical upright position, it will assume its proper or original relationship with respect to the cycle of the engine.

In the absence of any torsional vibration in the crank shaft, the point of the stylus or pencil would travel around the drum without deviation from its circular path and would trace a straight line on the record sheet 14. However, in the actual operation of the engine, the stylus has a vibrational movement due to torsional vibrations set up in the crank shaft and resulting in the relative movement of the driving and driven members with which the stylus is operatively connected. Under such conditions, the point of the stylus in its travel around the drum will trace on the record-receiving sheet a wavy line or curve, the undulations of which constitute a record of the torsional vibrations of the engine crank shaft.

Having thus described the invention, what is claimed is:

1. A record sheet holder having a record receiving surface adapted to be placed in contact with a marking device to be marked thereby with a record of any relative displacement of the holder and the marking device, and a manually settable index on said holder for orientation to a selected position with respect to the initial setting of the holder and marking device whereby when the said holder is withdrawn from contact at any stage of relative displacement of holder and marking device and again placed in contact with the marking device with the index in the said selected position it will be properly positioned with respect to the marking device to obtain a corresponding relationship of the record and the relative movements of the holder and the marking device.

2. The combination such as defined in claim 1, in which the record sheet holder is provided with a cylindrical handle and the index consists of a ring provided with a pointer and rotatable about the said handle for varying the position of the pointer.

3. The combination such as defined in claim 1, in which the record sheet holder comprises a drum having a cylindrical handle and the manually settable index consists of a ring rotatable about said handle and provided with a screw threaded radial opening and a pointer provided with a screw threaded shank engaged in the said radial opening of the ring and having a knurled head whereby it may be turned to screw the said shank down tight against the said handle to lock the ring against rotation or to unscrew the shank to free the ring for adjustment about the handle to change the angular position of the pointer.

4. A sheet supporting and tautening device comprising a drum around which the sheet is adapted to be placed, a roller journaled in said drum and adapted to receive the ends of the sheet, means for turning the roller about its axis in either direction to tauten the sheet around the drum, a prismoidal body connected with the roller to be turned therewith, a spring-pressed element mounted on the drum and having a flat face frictionally and yieldingly bearing against the side of the body for contacting the lateral faces of the latter successively and for the full width of each during the turning of the said roller in either direction whereby to arrest the turning motion of the same.

5. A sheet supporting and tautening device having, in combination, a drum, a handle extending axially from one end of the drum and being of less diameter than the drum, a ring releasably fixed on the handle in slightly spaced relation to the end of the drum, a rod journaled lengthwise of the drum to be turned about the axis in either direction subjacent the periphery of the latter and provided at the handle end of the drum with a coaxial prismoidal head disposed in the space between the said ring and the adjacent end of the drum, means carried by the head whereby it may be turned manually, and a spring pressed plunger mounted in the said handle and frictionally and yieldably bearing against the side of the prismoidal head, said plunger having a flat face adapted when the roller is turned about its axis in either direction to contact the lateral faces of the said head successively and in a plane normal to a line perpendicular to the axis of the head and passing centrally through the contacting faces.

FORD L. PRESCOTT.